July 3, 1962 — P. R. NEWCOMB — 3,041,995
AUTOMATIC PILOT FOR NAVIGABLE CRAFT
Filed Oct. 14, 1959
FIG. 1.
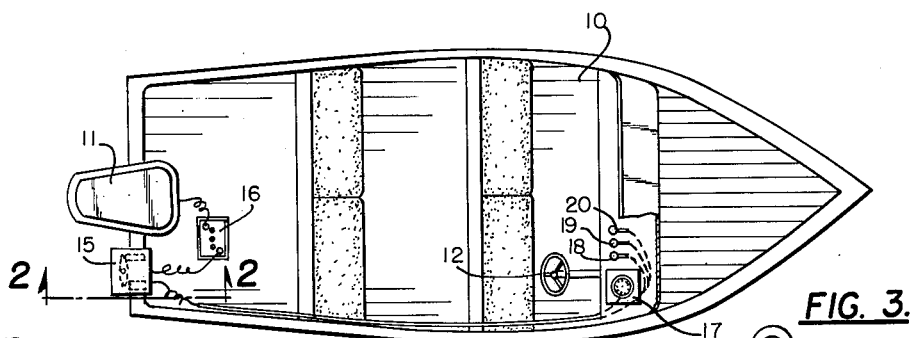
FIG. 2.
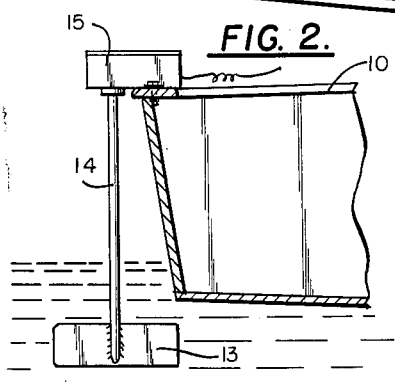
FIG. 3.
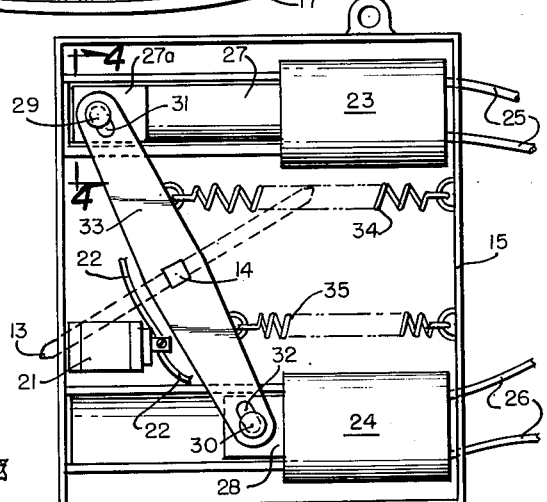
FIG. 4.
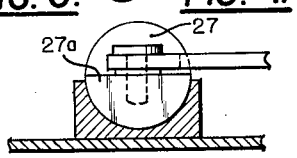
FIG. 5.
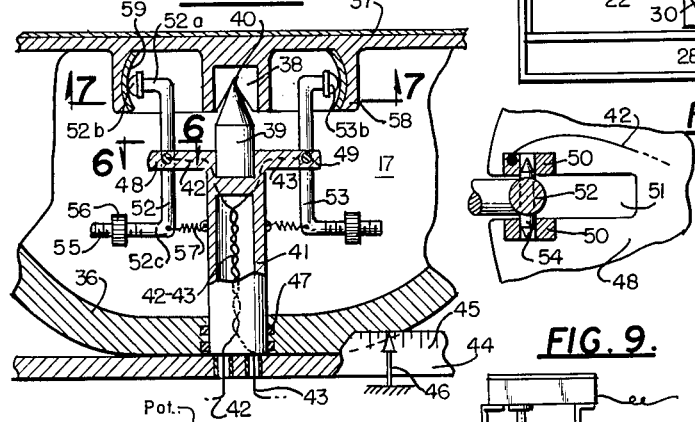
FIG. 6.
FIG. 7.
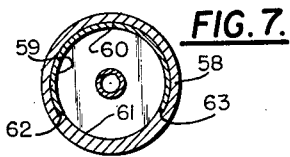
FIG. 8.
FIG. 9.
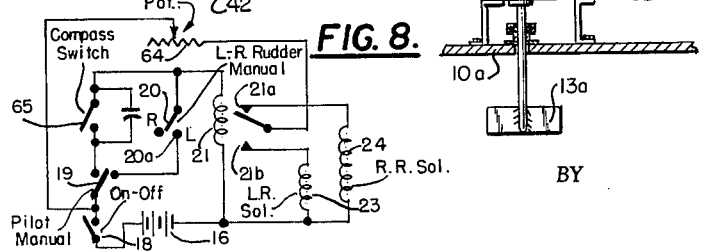
INVENTOR
Paul R. Newcomb
BY Moore & Hall
ATTORNEYS United States Patent Office 3,041,995
Patented July 3, 1962

1

3,041,995
AUTOMATIC PILOT FOR NAVIGABLE CRAFT
Paul R. Newcomb, 2564 Holman Ave., Silver Spring, Md.
Filed Oct. 14, 1959, Ser. No. 846,437
4 Claims. (Cl. 114—144)

The present invention relates to automatic piloting and steering devices for use in water craft; and is more particularly concerned with a highly improved, simple piloting structure adapted to be incorporated into relatively small navigable craft, such as inboard or outboard motor boats; and adapted to effect automatic steering of such craft over a course preselected by the operator thereof.

Various forms of automatic pilot constructions are known at the present time. These structures are ordinarily complex and costly; and are normally adapted for use in the navigation of relatively large vehicles. It is often desired, however, to effect some form of automatic steering control on smaller navigable craft such as motor boats, in order that manual steering of such craft may be dispensed with when the craft is to be propelled over a relatively long and unobstructed course. Automatic piloting structures suggested heretofore are not adapted for such craft; or, if capable of being adapted thereto, are so complex, costly and weighty as to be impractical.

The present invention, recognizing these difficulties, is accordingly concerned with a relatively small, simple, and inexpensive structure adapted to be installed on vehicles such as motor boats, and adapted to give reliable and accurate automatic piloting thereof thereby to reduce fatigue and necessary course checking during extended trips.

It is accordingly an object of the present invention to provide an improved automatic piloting device adapted for use on relatively small water craft.

Another object of the present invention resides in the provision of an auxiliary steering device adapted to be installed on water craft and operative, when in use, to guide said craft over a preselected course without requiring attention or supervision.

A still further object of the present invention resides in the provision of a simple inexpensive and highly reliable piloting device adapted to be employed in conjunction with water craft.

Still another object of the present invention resides in the provision of an automatic steering device for use with motor boats, which device may be selectively employed or deenergized as may be desired.

A still further object of the present invention resides in the provision of an automatic steering device for use with water craft which is adapted to permit course changes to be readily but accurately made as may be desired.

Still another object of the present invention resides in the provision of an auxiliary steering device for use with water craft, which may be automatically or manually operated as may be desired.

In providing for the foregoing objects and advantages, the present invention contemplates the provision of an automatic piloting device comprising a small area auxiliary rudder adapted to be mounted on a water craft. This small rudder is in turn associated with driving means preferably comprising a pair of selectively energized solenoids; and the energization of said solenoids or other driving means selected is in turn controlled by electric circuit means associated with direction determining means, such as a magnetic compass, carried by the craft. The overall device is adapted to be so manipulated that a course may be preselected, whereafter the driving means, e.g. the aforementioned solenoids, are selectively energized and deenergized, thereby to cause the aforementioned small rudder to hunt constantly about a position corresponding to a correct and preselected course.

2

In the event that the craft should for some reason deviate appreciably from said preselected course, the auxiliary rudder is maintained in appropriate position to return the craft to the desired course, whereafter the hunting of said rudder continues thereby to maintain the craft on said course. Course changes can be readily effected through a simple alteration of the position of contacts comprising a portion of the aforementioned electrical circuit relative to a portion of the aforementioned magnetic compass; and once the course is so changed or selected, the auxiliary steering device will operate to maintain the craft on the course so selected, so long as the overall system is energized.

The foregoing objects, advantages, construction and operation of the present invention will become more readily apparent from the following description and accompanying drawings, in which:

FIGURE 1 is a top view of an outboard motor boat having the present invention installed thereon.
FIGURE 2 is a view taken on line 2—2 of FIGURE 1.
FIGURE 3 is a detail view of the solenoid rudder control comprising a portion of the present invention.
FIGURE 4 is a view taken on line 4—4 of FIGURE 3.
FIGURE 5 is a detail view of the compass control circuit employed in the present invention.
FIGURE 6 is a view taken on line 6—6 of FIGURE 5.
FIGURE 7 is a view taken on line 7—7 of FIGURE 5.
FIGURE 8 is a schematic diagram of the electrical circuit comprising the control circuit of the present invention; and
FIGURE 9 is an illustrative view showing the present invention incorporated in an inboard motor boat.

Referring now to FIGURE 1, it will be seen that the invention is particularly adapted for use on a motor boat 10; and the particular boat 10 shown in FIGURE 1 is of the outboard type, comprising an outboard motor 11 which is rotatable about a vertical axis by means of appropriate cables or the like which connect to a steering wheel 12 and this comprises the main steering apparatus for the boat 10. This main steering apparatus does not per se comprise the present invention, it being understood that when the present invention is in use main steering apparatus will normally be secured in a position where it can cause no turning effect to be exerted on the boat.

Automatic control of the boat 10 is, in accordance with the present invention, effected when desired under the control of an auxiliary rudder 13 (see FIGURE 2) which is coupled via a shaft 14 to a driving unit 15 mounted at the stern of the craft preferably to one side of motor 11. The rudder 13 is of the balanced type, i.e. equal areas thereof are disposed to both sides of the rudder shaft 14 thereby to avoid any restoring torque on the shaft 14. By using such a balanced structure, movements of the rudder 13 can be accurately effected by driving sources having relatively little power, i.e. solenoids, inasmuch as the solenoids or other driving sources need merely control the position of the rudder 13 without being further required to resist turning moments on the rudder due to the force of the water on the rudder's surface.

In addition, as will become apparent from the subsequent discussion, the rudder 13 is preferably of small surface area, i.e. it may exhibit an overall surface area in the order of eight square inches whereby the controlling effect of said rudder is of relatively small magnitude. This is particularly to be desired since, as will appear from the subsequent discussion, the rudder 13 will tend to hunt about a predetermined center position once a preselected course has been achieved; and this hunting will, be reason of the small surface area of the rudder, be incapable of producing short term high amplitude fluctuations in the craft's course, whereby the rudder is particularly operative to put the craft onto a preselected course and thereafter to maintain the craft on said course notwithstanding movement of the rudder during this maintenance operation.

Control box 15, which will be described in greater detail subsequently in reference to FIGURE 3, includes driving means such as solenoids which derive their energization from a source of electrical power under the control of appropriate switching means. The source of power may comprise, as illustrated in FIGURE 1, a battery which may be further connected to the motor 11 to act as a starting battery therefor. It will be appreciated, however, that the battery 16 may in fact be replaced by other electrical sources; and may in fact comprise a generator in those craft wherein such a generator is provided. Control box 15 is further coupled via appropriate electrical leads (diagrammatically illustrated in FIGURE 1) to a magnetic compass 17 as well as to a plurality of control switches 18, 19 and 20.

The function of switches 18 through 20 will become more readily apparent as the description proceeds; and it will presently suffice to note that switch 18 is an on-off switch acting to permit the automatic pilot of the present invention to be energized or deenergized as may be desired. Switch 19 is a two-position "pilot-manual" switch adapted to permit the operator to select between automatic and manual operation when the auxiliary steering device of the present invention is in fact energized and in use; and switch 20 is a two-position manual rudder control adapted to permit the operator of the craft to effect manual steering of the craft when the auxiliary steering device of the present invention is in use and manual operation thereof has been selected.

The actual driving source preferably employed in conjunction with auxiliary rudder 13 is best shown in FIGURE 3. In particular, control box 15 has mounted therein a relay 21 (for purposes to be described hereinafter) associated with electrical leads 22 comprising a portion of the electrical circuit to be described in greater detail in reference to FIGURE 8. Control box 15 further includes a pair of solenoids 23 and 24 comprising respectively a left rudder solenoid and a right rudder solenoid. The solenoids 23 and 24 are associated with electrical leads 25 and 26 respectively, also comprising a portion of the electrical circuit to be described hereinafter in reference to FIGURE 8; and the said solenoids 23 and 24 include a pair of slidably movable plungers 27 and 28, each of which is adapted to be retracted into the coils of said solenoids when their associated solenoid is energized. The outermost end of each of plungers 27 and 28 is flattened as at 27a (see especially FIGURE 4); and pins 29 and 30 extend upwardly from these flattened plunger portions through a pair of elongated apertures 31 and 32 formed at the opposite ends of an elongated rudder control bar 33. Rudder control bar 33 is attached at its central portion to the aforementioned rudder post 14, which is in turn affixed to auxiliary rudder 13, whereby the actual position of auxiliary rudder 13, relative to the center line of boat 10, is determined by the position of rudder control bar 33 which is in turn controlled by the relative states of energization of the solenoids 23 and 24.

A pair of elongated tension springs 34 and 35 are connected between the case of control box 15 and portions of rudder control bar 33 disposed on opposite sides of the central post 14; and these spring 34 and 35 are balanced so as to normally maintain rudder control bar 33 in a generally vertical position, and rudder 13 in a generally horizontal position (both as viewed in FIGURE 3), when neither of the solenoids 23 or 24 is energized, i.e. when the on-off switch 18 is in the "off" position wherein the present invention is in its disabled state.

The states of energization of solenoids 23 and 24 are controlled by a course selecting apparatus preferably comprising the magnetic compass 17. The compass arrangement which is adapted to provide such control of the solenoids will be best understood by reference to FIGURES 5 through 7 inclusive. In particular, the compass 17 preferably comprises a compass bowl 36 associated with a rotatable compass card 37. This arrangement of bowl and compass card is conventional; and it will be understood that the bowl can be filled with an appropriate liquid and that, in addition, appropriate magnetized structures are provided to control the deviation of compass card 37.

Compass card 37, in accordance with the modified form of magnetic compass structure shown in FIGURE 5 is supported at a central pivot point 38 upon a central post 39 having a conical pivot 40 at the upper end thereof. Post 39 is in turn seated within a pillar 41 preferably formed of an insulating material such as an appropriate plastic. Post 41 is of hollowed configuration to receive a twisted pair of leads 42, 43; and the lower end of said post passes through the lower central portion of compass bowl 36 into engagement with a rotatable disc 44 having a scale 45 thereon cooperating with a fixed reference point 36 to permit course changes in the manners to be described hereinafter. Since the compass bowl 36 may be filled with a liquid, appropriate seals such as 47 are provided between said bowl 36 and the lower portion of pillar 41 to prevent escape of fluids therefrom.

The upper end of pillar 41 is provided with a pair of diametrically opposed ears 48 and 49, the structure of which is best shown in FIGURE 6. In particular, each of the ears such as 48 preferably comprises an insulating material of the same type comprising pillar 41; and each said ear has sealed therein one of the two leads 42 and 43. A conductive bearing structure such as 50 is disposed adjacent the outer edge of each of the ears 48 and 49, with this bearing structure 50 being disposed on opposite sides of an elongated slot 51 formed in each ear. Slot 51 is designed to receive a pivotally mounted contact structure, there being two such contact structures designated 52 and 53 associated with the two ears 48 and 49 respectively. Each of the contact structures, e.g. 52, is of conductive material and includes a conductive pivot pin 54 which is mounted in bearing 50 to provide both mechanical and electrical connections between the contact structure such as 52 and the bearing such as 50 associated with the electrical lead such as 42, all for purposes to be described hereinafter.

Each of the contact structures 52 and 53 preferably takes the form shown in FIGURE 5. In particular, the upper end of the contact structure includes an orthogonal projection 52a having a rounded contact head 52b thereon; and the lower end of each said contact structure includes a further orthogonal projection 52c which is threaded as at 55 to receive in thread engagement therewith an adjustable weight 56. In addition, a small spring in tension such as 57 is disposed between the lower end of contact structure 52 (or 53) and the central pillar 41, as illustrated.

The lower surface of compass card 37, in addition to defining the central pivot point 38, also defines an annular wall 58 having an arcuate inner surface 59. The rounded contact head 52b associated with contact 52, and the diametrically opposed rounded contact head 53b associated with contact 53, are disposed at substantially the same level as the upper end of pivot 40 at a position closely adjacent the central section of curved surface 59. By reason of this configuration therefore any tilting of compass card 37 about pivot structure 39—40 has substantially no effect upon the contact between heads 52b and 53b and the adjacent curved surface 59, whereby the contact pressure maintained between said contact heads and curved surface remains substantially constant. This constant pressure is partially determined by the springs such as 57; and fine control of the contact pressure can be effected by adjustment of the weights 56. It will be appreciated that the contact pressure between contact heads 52b, 53b and the curved wall 59 of compass card 37 should be relatively light in order to prevent contact heads 52b, 53b from binding against wall 59 and preventing free rotation of compass card 37.

Annular wall 58 (see FIGURE 7) includes a conductive deposit along a portion of the inner arcuate surface 59. In particular such a conductive deposit is shown at 60 and extends over an arc of substantially 225° along the interior of surface 59, with the remaining portion 61 of said interior surface 59 being formed of an insulating material comprising the material of annular wall 58. Deposit 60 is preferably of highly conductive material, e.g. silver, as are the contact heads 52b and 53b, thereby to assure that a low resistance contact is established between the contact heads and the inner surface of wall 58, notwithstanding the light contact pressure preferably employed. Due to the fact that the conductive deposit 60 extends over an arc of substantially 225°, while the contact heads 52b, 53b are disposed 180° apart, an electrical circuit can be completed between contact heads 52b, 53b only when both of these contact heads are in engagement with portions of conductive deposit 60. As compass card 37, and its associated annular wall 58 rotate relative to diametrically opposed contact heads 52b, 53b, the circuit established by conductive deposit 60 between these contact heads will be broken at points such as 62 and 63 comprising the junctions between conductive deposit 60 and insulating wall 61.

The operation of the overall arrangement, and the relationship of the several parts thus described to one another, will become most readily apparent from a consideration of the electrical circuit shown in FIGURE 8. When the on-off switch 18 is in its "off" position (i.e. the open position), the circuit is completely deenergized and no power can be applied to either of the solenoids 23 or 24. For this condition of operation therefore the auxiliary piloting device of the present invention is inoperative; and the springs 34 and 35 (FIGURE 3) function to restore the rudder control bar 33 to such position that the auxiliary rudder 13 is trimmed in a position substantially parallel to the axis of the boat 10.

Let us now consider that the on-off switch 18 is closed, thereby to apply energization from battery 16 to the remainder of the circuit. Under this latter condition, the system is adapted for either automatic or manual operation depending upon the position of the "pilot-manual" switch 19. Examining first the manual operation, let us assume that the blade of switch 19 has been moved to its righthand position, thereby connecting the battery 16 to the contact 20a of the manual steering control switch 20. Switch 20 is operative to control the state of energization of the coil in relay 21; and whether or not relay 21 is energized in turn determines which of the two solenoids 23 and 24 is ultimately energized from source 16.

In particular, let us first assume that manual control switch 20 is in its right control position, i.e. the position illustrated in FIGURE 8. Under these circumstances, relay 21 is deenergized, in which event the relay contact 21a is closed. A completed circuit is thus provided from the lefthand terminal of battery 16 through switch 18 and thence through a potentiometer 64 (provided for adjusting the force to be exerted by solenoids 23 and 24) through closed relay contact 21a and thence through the right rudder solenoid 24 back to the right-hand terminal of battery 16. The right rudder solenoid 24 is thereby energized so that its plunger 28 retracts; and the rudder 13 assumes the position shown in FIGURE 3. This state of energization of solenoid 24, and the resulting positioning of auxiliary rudder 13, will prevail so long as switch 20 is in the position illustrated in FIGURE 8.

If now the manual steering switch 20 should be moved to its lefthand position, a circuit is closed through the coil of relay 21 whereby said relay is energized to move the blade thereof into contact with relay contact 21b. The right rudder solenoid 24 thereby becomes deenergized and left rudder solenoid 23 becomes energized through a circuit path essentially similar to that already described above. Under this latter condition therefore, plunger 27 of solenoid 23 is retracted to move rudder 13 to such position that the vehicle 10 tends to steer toward the left. In this manual condition therefore the positioning of rudder 13 can be varied through a simple manipulation of switch 20.

If now the "pilot-manual" switch 19 should be moved to its automatic or "pilot" position (i.e. the lefthand position of FIGURE 8), the state of energization of relay coil 21 is now assumed by the compass switch 65 rather than by the manual steering switch 20. Compass switch 65 in fact corresponds to the contact heads 52b, 53b associated with conductive section 60 and nonconductive section 61 of the annular wall 58 already described (associated, of course, with the remainder of the structure, also described). In particular, when the contact heads 52b and 53b are both in engagement with the conductive deposit 60, a circuit is completed through this deposit 60 between the contact heads 52b, 53b whereby compass switch 65 may be considered as closed. On the other hand, when either of the contact heads 52b, 53b is in engagement with the insulating portion 61 of annular wall 58, the compass switch 65 may be considered as open. Thus, relative movement between compass card 37 and the contact heads 52b, 53b will determine whether compass switch 65 is open or closed, with the transition between open and closed position occurring in the regions 62 and 63, already described.

Let us first assume that both of the contact heads 52b and 53b engage portions of conductive deposit 60 wherefore compass switch 65 is closed. Under these conditions a circuit is completed between the terminals of battery 16 through switch 65 and the coil of relay 21, to move the blade of said relay into contact with contact 21b, thereby to energize solenoid 23. A turning moment in one direction will therefore be applied to the boat 10, and in particular the boat 10 will tend to steer toward the left. As this steering progresses, relative motion will be effected between compass card 37 and its associated compass bowl 36 until one of the contact heads 52b, 53b reaches a region such as 62 (or 63).

As this contact head then moves into engagement with the insulating portion 61, compass switch 65 may be considered as opened; and relay 21 will thereby become deenergized whereby its blade will move into contact with relay contact 21a thereby to immediately energize the right rudder solenoid 24. The boat 10 will then tend to steer in an opposite direction. This change in direction will cause relative motion, in an opposite direction, between compass card 37 and its associated bowl 36 whereby the contact head in engagement with insulating section 61 will be moved back toward conductive section 60.

In short, once the automatic position of switch 19 is selected, the magnetic compass 17 will assume control of the states of energization of solenoids 23 and 24; and these states of energization are such that rudder 13 will cause the craft to move progressively toward a position wherein one of the contact heads 52b, 53b is in the region of a junction 62 or 63. One or the other of solenoids 23 and 24 will always be energized, and the actual solenoid energized will constantly reverse as the contact head 52b or 53b hunts across a juncture such as 62 or 63. This hunting operation assures that the craft remains on the course selected, but due to the relatively small area of rudder 13, the hunting has no significant effect on short range steering deviations of the vehicle.

The actual course achieved by the overall system is, of course, determined by the relative position of the contact heads 52b, 53b and junctures 62, 63 at the time that the piloting system is energized. Course corrections or changes are effected by a rotation of plate 44, which rotation moves the contact head 52b (or 53b) away from its hunting position adjacent one of the junctures 62 or 63. In the event that this course direction is such that one of the contact heads is moved into engagement with insulating section 71, the right rudder solenoid 24 will be continually energized for a period of time sufficient to restore one of the contact heads to a position adjacent one of the junctures 62 or 63 whereby the course of the vehicle is changed and thereafter maintained on the newly selected course by a subsequent hunting operation of the type described. On the other hand, if the course correction is such that both of contact heads 52b, 53b engage a conductive section 60, then solenoid 23 will be continuously energized for a sufficient time to correct the course in an opposite direction whereafter the newly selected course is maintained by a further hunting operation of the type described. In order to assist in making a course correction, scale 45 preferably carries appropriate markings.

It will be appreciated, of course, that the preceding discussion has been concerned with the use of the device on an outboard motor boat. The device is, however, fully adapted for use on an inboard motor boat; and such utilization of the system is illustrated in FIGURE 9. The description given applies fully, with the exception that in this latter circumstance, rudder 13a is mounted so as to pass through the hull 10a rather than being disposed in the manner shown in FIGURE 2.

While I have thus described a preferred embodiment of the present invention, many variations will be evident to those skilled in the art. By way of example, the mechanical contact means of FIGURE 5 may be replaced by other control structures, including photoelectric means, adapted to detect deviations between a desired and actual orientation of the boat. All such variations and modifications as are in accord with the principles described, are meant to fall within the scope of the appended claims.

Having thus described my invention, I claim:

1. A steering system for a craft comprising in combination, a primary rudder for said craft having a relatively large effective area and being rotatable to any one of a plurality of positions, an auxiliary rudder having a relatively small surface area as compared to said primary rudder to effect relatively small long-range turning moments on said craft, means for controlling the position of said auxiliary rudder to thereby automatically control the steering of said craft comprising driving means coupled to said auxiliary rudder for moving said auxiliary rudder to one or the other of two predetermined positions oppositely inclined respectively to the center line of said craft, control means for said driving means comprising a rotatable magnetic member which rotates about a central pivot with changes in heading of said craft, conductive means carried by said member and comprising a conductive deposit of arcuate configuration spaced from and partially surrounding said central pivot, portions of said member adjacent the ends of said conductive deposit comprising an electrical insulating material, electrical contact means located on said craft at a predetermined reference position related to a desired orientation of said craft and adapted to engage and disengage with said conductive means as said member rotates with changes in heading of said craft and thereby alternatively moving said conductive deposit and said electrical insulating material into contact with said contact means, said contact means being in engagement with said member at the locus of movement of said conductive deposit during rotation of said member about its pivot, means for operating said auxiliary rudder to one of its two predetermined positions when said contact means is in engagement with said conductive deposit and for moving said auxiliary rudder to the other of its two predetermined positions when said electrical contact means is in engagement with said electrical insulating material.

2. In combination, a craft, direction determining means on said craft including a magnetic compass card rotatable about a central pivot with changes in orientation of said craft, conductive means carried by said compass card and comprising a conductive deposit of arcuate configuration carried by said card and spaced from and partially about said central pivot, portions of said card adjacent the ends of said conductive deposit comprising an electrical insulating material, electrical contact means located on said craft at a predetermined reference position related to a desired orientation of said craft and adapted to engage and disengage said conductive means as said compass card moves from one to the opposite side of said predetermined reference position with changes in orientation of said craft, said contact means being in engagement with said compass card at the locus of movement of said conductive deposit during rotation of said card about its pivot, a rudder on said craft, electrical driving means coupled to said rudder for controlling the position thereof, and means for varying the energization of said driving means in response to engagement and disengagement of said contact means with said conductive means thereby to vary the positioning of said rudder with changes in orientation of said craft so as to maintain the orientation of said craft substantially at said desired orientation.

3. The combination of claim 1 comprising a control arm attached to said rudder and extending transverse thereto, said driving means comprising first and second solenoids respectively connected to said control arm on opposite sides of said rudder, said control means being operative always to effect energization of one of said first and second solenoids and to simultaneously effect deenergization of the other of said first and second solenoids whereby said rudder assumes one or the other of said predetermined positions depending upon which of said solenoids is energized.

4. The combination of claim 2 wherein said conductive deposit extends over an arc in excess of 180° but less than 360°, said contact means comprising a pair of contacts spaced substantially 180° from one another on opposite sides of said central pivot, whereby said conductive deposit completes an electrical circuit through said pair of contacts only when both said contacts are in engagement with portions of said conductive deposit.

References Cited in the file of this patent

UNITED STATES PATENTS

| 1,360,325 | Simmon | Nov. 30, 1920 |
| 1,707,690 | Sperry | Apr. 2, 1929 |
| 2,068,065 | Neubert | Jan. 19, 1937 |
| 2,862,168 | Zober | Nov. 25, 1958 |
| 2,891,205 | Freeman | June 16, 1959 |